Jan. 6, 1942.  C. E. HOLT  2,268,706
APPARATUS FOR REFINING LUBRICATING OILS
Filed Jan. 20, 1939  2 Sheets-Sheet 1
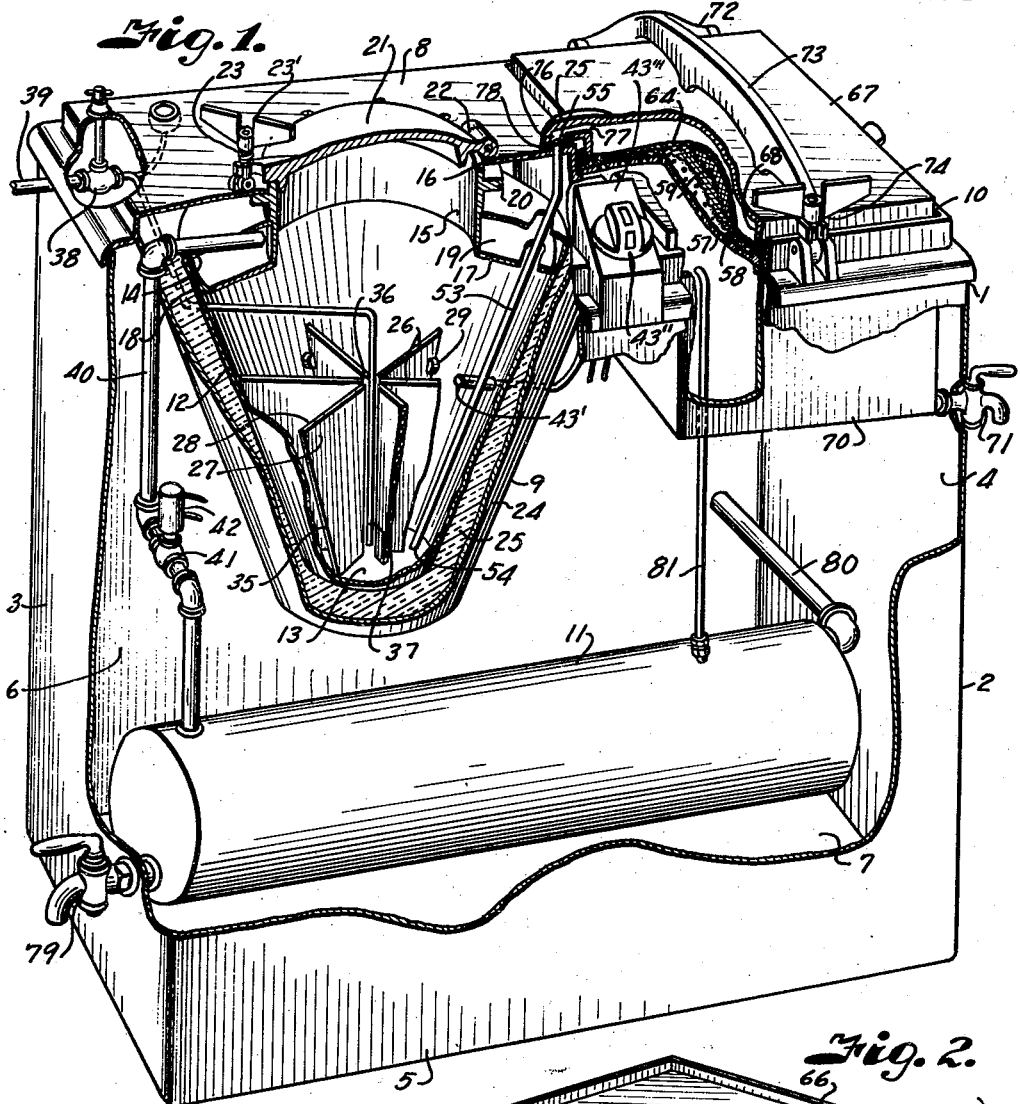
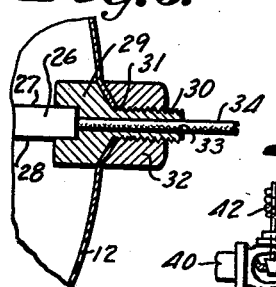
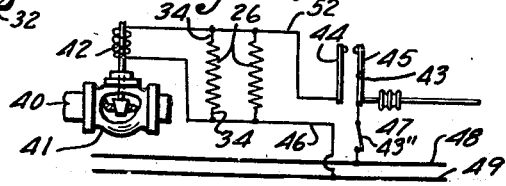
INVENTOR
Carl E. Holt.
BY Arthur LeBrown
ATTORNEY

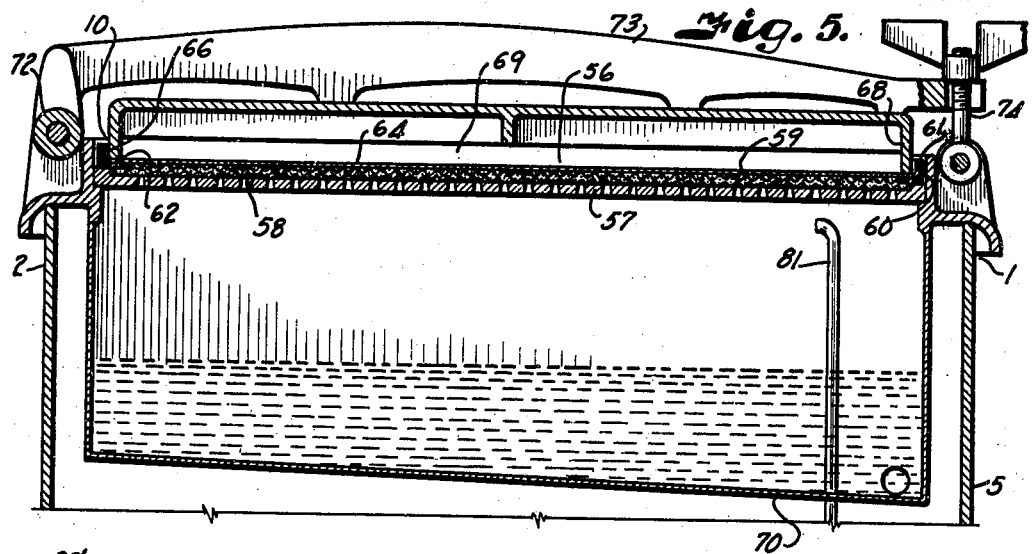
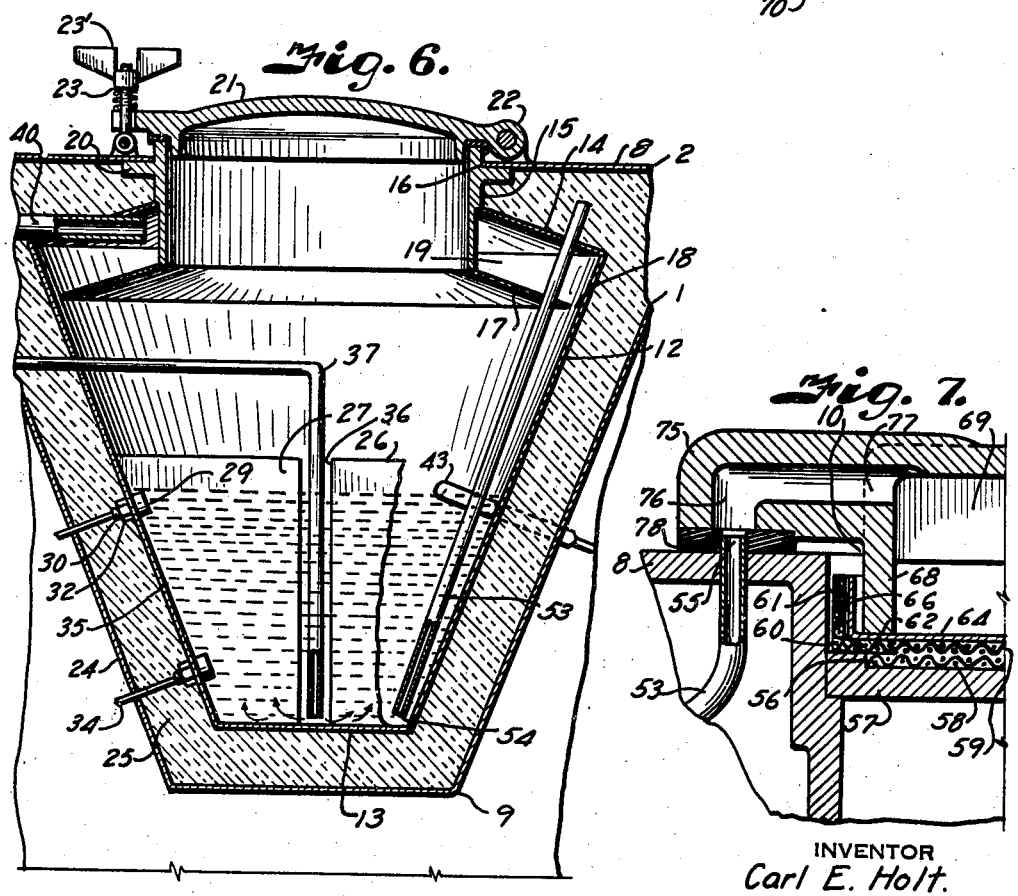

Patented Jan. 6, 1942

2,268,706

UNITED STATES PATENT OFFICE 2,268,706

APPARATUS FOR REFINING LUBRICATING OILS

Carl E. Holt, Kansas City, Mo.

Application January 20, 1939, Serial No. 251,953

4 Claims. (Cl. 196—16)

This invention relates to apparatus for refining oil, particularly used lubricating oil, and has for its principal object to provide an apparatus of this character for effecting rapid purification of small, individual quantities of oil, for example that drained from the crank-case of a motor vehicle, so that the same oil may be returned to the crank-case without intermixture with other grades and kinds of oil during purification.

It is also an object of the invention to provide a refining apparatus with a relatively small but deep heating chamber wherein the oil is heated and kept in a state of agitation in association with a filtering media during which time the oil is thoroughly scrubbed, diluents evaporated, and foreign solid particles are adsorbed by the filtering media.

Other objects of the invention are to provide large heating surfaces with which the oil is contacted in effecting rapid evaporation of diluents without overheating the oil; to provide a wet area over the pool of oil for fractionating the vapors issuing therefrom; to effect agitation by the introduction of a dry gaseous medium which is also utilized for displacing the oil from the heating chamber into a filtering chamber and to effect pressure filtration of the oil from the filtering media and adsorbed solid matter; and to provide for rapid removal of the light products of distillation and odors without undue back pressure in the refining apparatus.

A further object of the invention is to provide for restricting rate of flow of oil from a heating chamber to the filter proportional to the filtering speed, thereby increasing filtering efficiency and preventing latent heat in the heating surfaces from overheating the oil film remaining thereon.

A further object of the invention is to provide a simple and easily operated apparatus wherein agitation, transfer and filtration of the oil is carried on automatically through manipulation of a single valve.

In accomplishing these and other objects of the invention, as hereinafter pointed out, I have provided improved details of structure, the preferred forms of which are illustrated in the accompanying drawing, wherein:

Fig. 1 is a perspective view of an oil refining apparatus embodying the features of the present invention, parts of which are broken away and shown in section to better illustrate the construction thereof.

Fig. 2 is a detail perspective view of a filtering tray and its supporting screen shown in spaced relation.

Fig. 3 is a detail section through a portion of the heating chamber, particularly illustrating mounting of the heating elements and their connection with the source of current supply.

Fig. 4 is a wiring diagram of the heating elements, the thermostat contacts, and valve for automatically controlling operation of the apparatus.

Fig. 5 is an enlarged cross-section through the filtering chamber.

Fig. 6 is an enlarged section through the refining vessel.

Fig. 7 is a detail section through the inlet connection of the filtering chamber.

Referring more in detail to the drawing:

1 designates an oil refining apparatus constructed in accordance with the present invention, and which includes a cabinet 2, having side walls 3—4, front and rear walls 5—6, a bottom 7, and a top 8, the top being supported on the upper edges of the walls to form a support for a refining vessel 9 and a filtering unit 10, which are enclosed within the housing along with a vapor collecting and condensate tank 11.

The refining vessel 9 is in the form of an inverted cone and has an inner wall 12 providing a conical chamber having its lower end closed by a bottom 13 and its upper end by a top 14. The top 14 has an axial collar 15 which forms the inlet to the refining vessel and projects through an opening 16 in the top 8. The collar depends within the upper end of the vessel and carries a circular baffle plate 17, having its periphery spaced from the wall of the vessel, as indicated at 18, to form an annular inlet to a vapor space 19 between the baffle 17 and the top 14, as clearly shown in Fig. 1. The collar 15 has a circumferential flange 20 which is fixed to the top 8 for supporting the vessel. The open end of the collar 15 is normally closed by a cover 21 connected therewith by a hinge 22 and yieldingly retained in closed position by means of a compression spring 23 mounted on a toggle bolt and compressed against the cover by a wing nut 23'.

The refining vessel also includes a spaced outer jacket 24 supporting a body of insulating material 25 to retain the heat generated within the vessel. Mounted within the constricted end of the vessel are plate-like heating elements 26 arranged radially with respect to the axis thereof and having flat heating surfaces 27 and 28 over which the oil is circulated, as later described.

The heating elements illustrated are of the electrical type and are retained in position by anchor members 29 having threaded shanks 30 projecting through openings 31 in the walls of the vessel, as shown in Fig. 3, and secured in sealing relation therewith by clamping nuts 32. The members 29, including the shanks 30, have openings 33 through which conductors 34 are extended for connection with the source of current supply. The outer edges 35 of the heaters conform to the wall of the vessel but the inner edges 36 terminate short of the axis to provide space for accommodating an inlet pipe 37 by which an agitating medium, such as air, is delivered into the vessel. The pipe 37 is shown as passing through the side wall of the vessel and is connected through a regulating valve 38 with a main supply pipe 39 leading from a source of compressed air as usually exists in filling stations, garages, and other places where motor vehicles are serviced.

Extending through the top of the vessel and connecting with the space 19 is a vapor discharge pipe 40 having connection with the tank 11 through a shut-off valve 41. The shut-off valve 41 is preferably operated by a solenoid 42 under control of a thermostatic bulb 43 located in the heat zone of the refining vessel and adapted to open contacts 44 and 45 in circuit with the magnet coil of the valve. The contacts also act to automatically open circuit to the resistance coils of the heaters when the valve 41 is closed. Current is supplied to the coils of the heaters through conductors 46 and 47 having connection with service lines 48 and 49. The conductor 46 is connected with one conductor 34 of each of the respective heating coils and with a terminal of the solenoid 42. The other conductor 47 is connected to the circuit breaking contact 45 and the other contact 44 is connected with the other conductors of the heating units and with the other terminal of the solenoid coil by a conductor 52, so that when the contacts are closed current flows through each of the heater coils to effect heating of the oil in the refining vessel and to retain the valve 41 in open position. A manually actuated switch 43' is provided in the conductor 47 for opening and closing the circuit independently of the thermostat. This switch including set of the actuating temperature of the thermostat is operated by a knob 43" mounted on a box 43''' which encloses the switch and the thermostatically operated contacts. Also extending through the upper portion of the refining vessel and through the baffle 17 is an oil transfer pipe 53 having its inlet 54 spaced slightly from the bottom 13 and its outlet 55 extending through the top 8 of the housing for connection with the filtering unit 10, now to be described.

The filtering unit 10 includes a relatively shallow sump 56 formed within the top 8 and having a perforated bottom 57 mounting a screen 58 carrying a superimposed screen 59. The screen 59 has the edges thereof turned upwardly, as at 60, and is molded with a plastic material to form an angle rim 61 providing a seat 62 for a filter tray 64.

The filter tray 64 is formed of filter paper or other suitable material adapted to pass the oil but to hold back the filtering media and solid particles that may be carried therewith from the refining vessel. The tray 64 has a bottom completely covering the screens and a rim 66 of sufficient height to retain the filtering media. The sump is closed by a cover 67 also conforming in shape to the sump but of slightly smaller dimensions so that a depending marginal flange 68 thereof is adapted to engage within the rim of the filter tray to clamp the bottom thereof against the seat 62 in forming an air and liquid seal about the marginal edge of the filtering tray. The filtering tray thus cooperates with the cover 67 to form a shallow filtering chamber 69 which is of relatively large area to effect spread of the oil required for rapid filtration and flow through the screens and perforations. The oil flows from the perforations into a receiving tank 70 that is suspended below the sump and is provided with a draw-off valve 71.

The cover 67 is secured to the top 8 by a hinge 72 carrying a clamping bar 73 bearing against the cover and having its opposite end secured by means of a clamping device 74, as shown in Fig. 1. Extending laterally from the side of the cover is an ear 75, having a channel 76 registering with the discharge end of the transfer pipe and which has an outlet port 77 connected with the filtering chamber. The lower face of the ear is shaped to sealingly engage about the end of the transfer pipe to prevent leakage through the joint when the cover is clamped in position. If desired the joint about the transfer pipe may be provided with a suitable gasket, indicated at 78, Fig. 7.

The tank 11 is shown as of cylindrical form and arranged horizontally within the cabinet as shown in Fig. 1. One end thereof is provided adjacent the bottom with a draw-off valve 79 whereby any collecting condensate is discharged. The opposite end of the tank is connected by a vapor discharge pipe 80 leading to atmosphere. The tank 11 is also connected by a pipe 81 extending through the bottom of the tank 70 and which terminates short of the perforated bottom 57 of the filter so that atmospheric pressure is maintained within the oil receiving tank 70 by way of the tank 11 and pipe 80.

In operating an apparatus constructed and assembled as described, a filter tray is placed in the sump on top of the screen 59 so that the side and end edges thereof seat upon the seat 62. The cover 67 is then moved to closed position and rigidly clamped to maintain a liquid and air tight seal with the filter tray. The oil to be refined, for example that drawn from an individual customer's motor, is poured into the refining vessel through the collar 15 and a filtering media such as fuller's earth, or equivalent, is added. The cover 21 is then moved to closed position and secured by the clamping device under pressure of the spring to normally prevent leakage and maintain pressure in the refining vessel when the valve 41 is closed. The valve 38 is then opened to admit compressed air by way of the pipe 37, which air is released at the bottom of the oil pool to cause agitation and scrubbing thereof. Attention is directed to the fact that the conical or funnel-like shape of the refining vessel causes oil to collect in a relatively small but deep pool, so that the compressed air is thoroughly effective in scrubbing and mixing of the oil with the filter media. The central discharge of the air also produces currents of oil that move in direct sweeping contact with the heating surfaces so that the oil is quickly brought to the temperature at which the liquid diluents, such as water, gasoline, and the like, rapidly vaporize without overheating of the oil. The vapors are carried by the air within the large upper portion of the vessel and pass around the baffle plate 17 for discharge through the pipe 40 into the vapor collecting and condensing tank 11.

The tank 11, being located in a relatively cool zone, effects condensation of the readily condensable vapors which may be drawn off through the valve 79. The uncondensable vapors, odors, and spent air are discharged through the pipe 80 to atmosphere. The air thus drives the vapors to the top of the vessel as rapidly as they are generated to contact the wetted surfaces of the baffle 17 and the upper portion of the vessel for fractionation of oil vapors.

When the temperature in the vessel has reached a point where it will operate the thermostat, the circuit through the contacts 44 and 45 is opened to suspend flow of current to the heating elements and solenoid 42, thereby closing flow through the pipe 40. The compressed air, however, continues to flow, maintaining circulation and agitation of the oil so as to absorb the latent heat of the heaters and avoid overheating of any portion of the oil. The accumulating air now builds up pressure within the refining vessel to effect movement of the oil through the transfer pipe into the filtering chamber.

Attention is directed to the fact that the transfer pipe is designed so that the flow of oil therethrough is at a rate to maintain a thin layer of oil over the entire area of the filter, thereby promoting efficiency of the filter and preventing too rapid displacement of the oil from the refining vessel. If the oil is too rapidly displaced, the latent heat remaining in the heating elements may overheat the film of oil on the heated surfaces so that they tend to carbonize. Since the filtering chamber is sealed, an air cushion is formed above the film of oil being filtered which is under sufficient pressure to promote flow of oil through the filtering paper into the collecting tank 70, leaving the filtering media in the tray. When the oil is completely discharged from the refining vessel the compressed air flows through the transfer pipe and effects drying out of the filtering media so that little or no oil remains therein. The purified oil collecting in the tank 70 is withdrawn through the valve 71 and returned to the customer's motor.

From the foregoing it is obvious that I have provided an oil refining apparatus whereby small, individual quantities of oil may be economically refined in a short period of time, thereby making it possible to refine separately the oil drained from each customer's motor.

What I claim and desire to secure by Letters Patent is:

1. An apparatus for refining used lubricating oil including a vessel having a heating chamber in the bottom thereof for confining a body of oil, electrical heating means in said chamber, pressure supply means connected with the vessel and having outlet into the bottom of the heating chamber for discharging an agitating medium under pressure into and through the oil to effect agitation and circulation thereof in contact with said heating means to effect vaporization of any diluents contained in the oil, a vapor outlet connected with the vessel, a filter connected with the vessel and having constantly open communication with the heating chamber, a valve selectively closing said vapor outlet, a solenoid connected with the valve, means supplying an electric current to said solenoid including the heating means, and a thermostat responsive to heat generated in the heating chamber for interrupting said current supply to effect closure of the valve whereby the agitating medium is effective in conveying the oil from said heating chamber through the filter.

2. An apparatus for refining used lubricating oil including a vessel having a heating chamber in the bottom thereof for confining a body of oil, heating means in said chamber, pressure supply means connected with the vessel and having outlet into the bottom of the heating chamber for discharging an agitating medium under pressure into and through the oil to effect agitation and circulation thereof in contact with said heating means to effect vaporization of the diluents contained in the oil, a vapor outlet connected with the vessel, a filter connected with the vessel, conduit means having constantly open communication with the heating chamber, a valve adapted to close said vapor outlet, and means including a thermostat responsive to heat generated in the heating chamber for closing the valve whereby the agitating medium is effective in conveying the oil from said heating chamber to the filter through the constantly open conduit means.

3. In an apparatus of the character described, an oil refining vessel for confining a body of oil in the bottom thereof, a filter, a constantly open transfer tube connected with the vessel and extending to said filter, a movable cover for the filter, means carried by the cover and arranged to close over the filter end of the transfer tube for establishing communication between said tube and the filter when the cover is closed, and means supplying a pressure medium to said vessel for transferring the oil through said tube to the filter.

4. An apparatus for refining used lubricating oil including a vessel having a heating chamber in the bottom thereof for confining a body of oil, electrical heating means in said chamber, pressure supply means connected with the vessel and having outlet into the bottom of the heating chamber for discharging an agitating medium under pressure into and through the oil to effect agitation and circulation thereof in contact with said heating means to effect vaporization of any diluents contained in the oil, a vapor outlet connected with the vessel, a filter connected with the vessel, conduit means having constantly open connection with the heating chamber, a valve selectively closing said vapor outlet, a vapor receiving tank connected with said outlet, means connecting the vapor receiving tank with atmosphere, means connecting the outlet side of the filter with said tank, and means responsive to heat generated in the heating chamber for closing the valve whereby the pressure medium is effective in conveying the oil from said heating chamber through the filter.

CARL E. HOLT.